Feb. 27, 1951  L. HAWORTH ET AL  2,543,366
TWO-POSITION FUEL VALVE FOR GAS-TURBINE TORCH IGNITERS
Filed Dec. 12, 1949  2 Sheets-Sheet 1

INVENTORS
LIONEL HAWORTH
& P. F. GREEN
by Wilkinson Mawhinney
Attys.

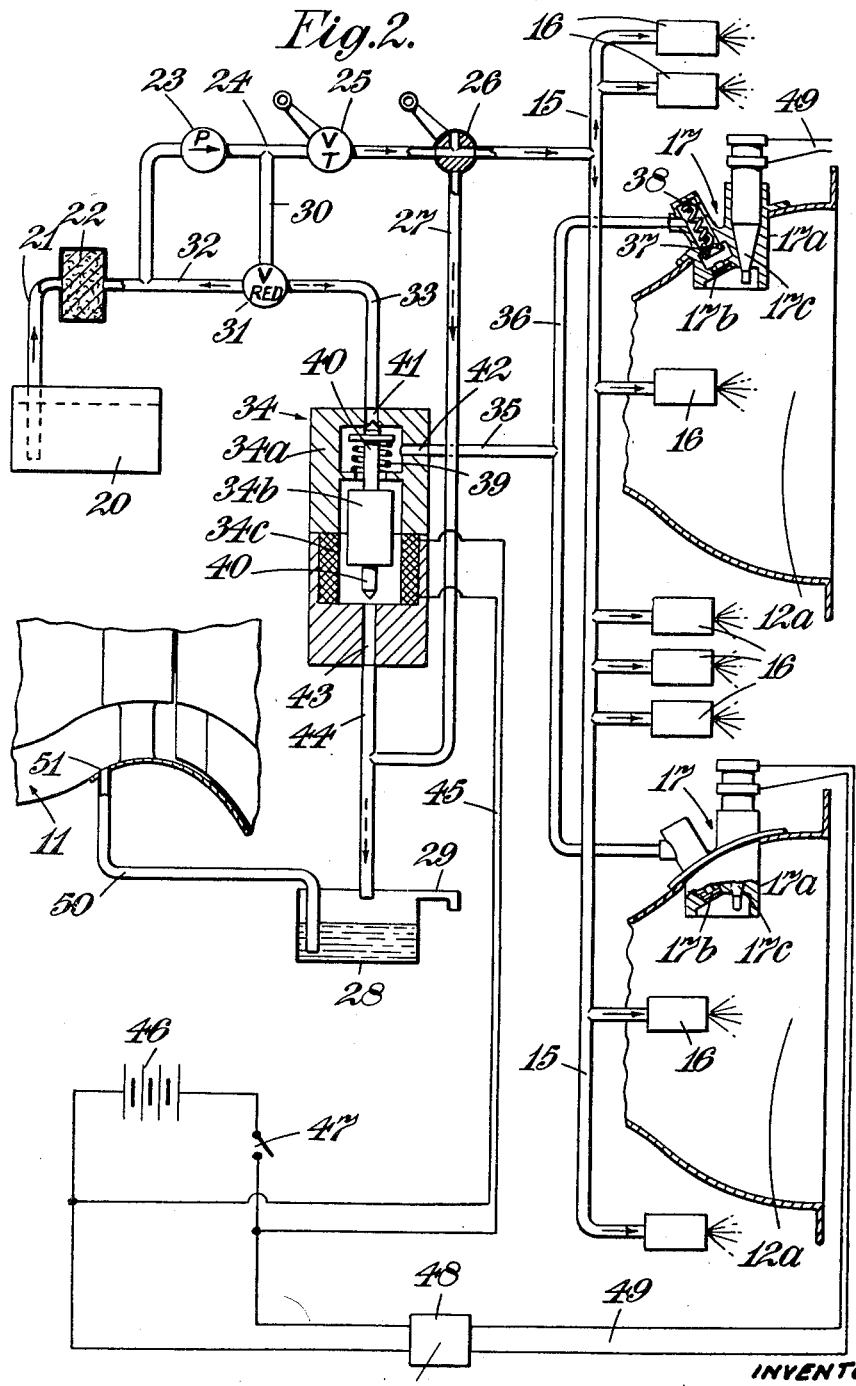

Patented Feb. 27, 1951

2,543,366

UNITED STATES PATENT OFFICE 2,543,366

TWO-POSITION FUEL VALVE FOR GAS-TURBINE TORCH IGNITERS

Lionel Haworth, Derby, and Percie Francis Green, Allestree, England, assignors to Rolls-Royce Limited, Derby, England, a British company Application December 12, 1949, Serial No. 132,516
In Great Britain December 29, 1948

13 Claims. (Cl. 60—41)

This invention relates to gas-turbine engine fuel systems of the kind having main fuel injection devices and incorporating ignition means therefor for initiating combustion comprising an auxiliary fuel jet and an ignition device associated with such fuel jet to initiate combustion of fuel issuing from said auxiliary fuel jet, which ignition means is thereby effective to produce a flame to ignite fuel delivered to a combustion space of the engine by main fuel injection devices. In the following specification such ignition means will be referred to as a "torch igniter."

The normal practice in using torch igniters in gas-turbine engines is to discontinue the fuel supply to the auxiliary jet after combustion of fuel delivered by the main fuel burners of the engine has been initiated, and hitherto the control of the fuel supply to said auxiliary fuel jet of the torch igniter has been effected by means of a solenoid operated valve wired in parallel with an electrical ignition device of the torch igniter, so that when the valve is open for the supply of fuel to the auxiliary jet, the electrical ignition device is operative.

It has also been the practice to deliver fuel to the auxiliary jet of the torch igniter from a low-pressure source associated with the main fuel system of the engine, for example, through a pressure-reducing valve fed from the main engine pump or from a booster pump associated with the main engine pump.

With the known arrangement, it is possible for the pressure of the gases within the combustion equipment to exceed the fuel delivery pressure to the auxiliary jet, so that gases from the combustion system may leak back past the valve controlling the fuel flow to the auxiliary jet and enter the main fuel system. This is undesirable and may, if leakage is excessive, result in stopping of the engine.

The present invention had for an object an improved control arrangement for the fuel supply system to said auxiliary fuel jet of a torch igniter, which will avoid this difficulty.

According to the present invention there is provided in a gas-turbine fuel system of the kind referred to the combination with a torch igniter, of a two-position valve to control the fuel supply to the auxiliary jet which valve is arranged, in its first position, to place a fuel supply line to the auxiliary jet in communication with a pressure fuel source, and, in its second position, to place said fuel supply line in communication through a conduit with a location at which in operation of the engine the pressure is less than the fuel pressure at said pressure fuel source.

Preferably the location is selected so that in operation of the engine the pressure at the location is atmospheric pressure or substantially atmospheric pressure.

According to a feature of this invention there may also be provided a further valve for preventing the flow of gas from the combustion space with which the torch igniter is associated back through the auxiliary jet and the fuel supply line to said location when the two-position valve is in its second position. For example, this further valve may be in the form of a non-return valve loaded into its closed position by resilient means and also arranged to be loaded to its closed position by the gas pressure within the combustion space associated with the torch igniter.

The two-position valve may conveniently be arranged to be operated by a solenoid or equivalent electrical device arranged in parallel with an electrical ignition device of the torch igniter so that the valve is set in its first position when the electrical ignition device is energized. The two-position valve may comprise a plunger working within a cylinder having a first connection to the pressure fuel source at one end, a second connection to the conduit leading to the selected location at its opposite end and a third connection to the fuel pipe line leading to the auxiliary jet intermediate its ends, and the plunger may be provided at each end with a valve element so that when the plunger is moved axially in one direction within the cylinder it closes off one end connection from the fuel supply line and opens the other end connection to the fuel supply line, and when it is moved in the opposite direction it closes the second connection and opens the first. The plunger is preferably spring-loaded so as normally to close off the fuel supply connection and to open the connection to the conduit leading to the selected low-pressure location.

The two-position valve may control the supply of fuel to a plurality of torch igniters.

One embodiment of this invention will now be described by way of example applied in the fuel system of a gas-turbine engine of the kind referred to. The description makes reference to the accompanying diagrammatic drawings in which:

Figure 2 illustrates diagrammatically the fuel system of the gas-turbine engine.

Figure 1:
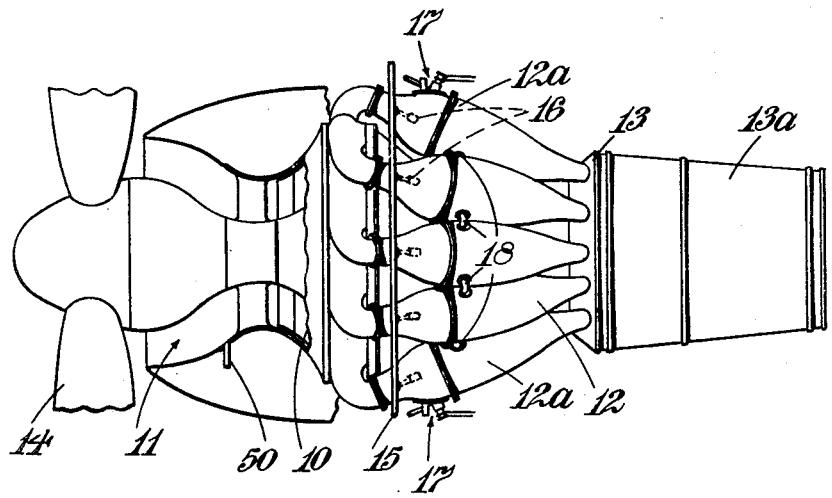
Figure 1 illustrates diagrammatically a gas-turbine engine.

Referring to Figure 1, the gas-turbine engine comprises a compressor 10 drawing in air from the atmosphere through an air-intake 11 and delivering compressed air into a plurality of combustion chambers 12 disposed in a ring around the engine and extending from the compressor to a turbine 13 which is arranged to drive the compressor 10 and also an airscrew 14. The gas-turbine engine also includes an exhaust assembly generally indicated at 13a.

The combustion chambers are supplied with fuel, to be burnt in the air delivered into them, through a manifold 15 comprising a number of branch pipes leading to main fuel injection devices 16, there being in the construction illustrated one fuel injection device to each combustion chamber 12.

In the construction illustrated some only of the combustion chambers are provided with torch igniter devices for initiating combustion within the combustion chambers 12. The torch igniters are indicated at 17 and it will be seen that in the construction illustrated two combustion chambers 12a have torch igniters mounted on them. The torch igniters initiate combustion in the two combustion chambers 12a and the combustion of the fuel in the remaining combustion chambers 12 is initiated by the flames from the combustion chambers 12a passing into the remaining combustion chambers 12 through balance pipes 18 which connect the combustion chambers together.

Referring now to Figure 2, the fuel system associated with the gas-turbine engine comprises a fuel tank 20 from which fuel is drawn through pipeline 21 and filter 22 by a pump 23 and thence delivered through a pipeline 24 past a throttle valve 25 and a shut-off cock 26 into the manifold 15 for the main fuel injection devices 16.

The shut-off cock 26 is shown in the position in which fuel can be delivered to the manifold 15 but when it is closed to prevent the delivery of fuel to the manifold 15, the manifold 15 is placed in communication with a drain pipe 27 leading to a collector tank 28 having a vent 29 to atmosphere.

The fuel supply to the torch igniters 17 is also taken from the main fuel pump 23, there being provided for this purpose a branch line 30 from the pipeline 24 between the fuel pump 23 and the throttle valve 25, the branch line leading to a pressure-reducing valve 31 having two outlet pipes one (32) leading back to the inlet side of the pump 23 and the other (33) leading through a two-position valve 34 and a pipeline 35 to a manifold 36 which feeds both torch igniters with fuel.

Each torch igniter 17 comprises a body portion 17a mounted on the wall of the associated combustion chamber 12a, an auxiliary jet 17b through which fuel is directed into the combustion chamber across the line of travel of fuel from the main injection device 16, and an electrical ignition device 17c which on energisation is arranged to ignite fuel issuing through the auxiliary jet 17b to produce a flame to ignite the fuel issuing from the main burner 16.

Each torch igniter also comprises a non-return valve adapted to prevent the flow of combustion gases from the combustion chamber into the manifold 36. The non-return valve comprises a conical member 37 loaded by means of a spring 38 on a valve seat formed in a passage between the manifold 36 and the auxiliary jet 17b of the torch igniter.

The two-position valve 34 above referred to comprises a cylinder 34a and a plunger 34b which is axially displaceable within the cylinder 34a by a solenoid 34c against the action of a spring 39. The plunger 34b is formed at each end with a needle valve element 40, the needle valve element at one end cooperating with a port 41 to close off communication between the pipeline 33 and the pipeline 35 which opens into the cylinder through port 42, and the needle valve element 40 at the other end co-operating with a port 43 to close off communication between the pipeline 35 and a drain pipe 44 leading to the collector tank 28.

The solenoid 34c is connected by leads 45 to a source of electrical power, indicated as a battery 46, and it is arranged that when the solenoid 34c is energised the port 43 is closed off from communication with the pipeline 35 and the pipeline 33 is open to communication with the pipeline 35. When the solenoid 34c is de-energised the spring 39 urges the plunger in a direction so that communication between the pipelines 33 and 35 is broken and that the pipeline 35 is in communication with the drain pipe 44.

The current supply to the solenoid 34c from the battery 46 is controlled by a switch 47 which also controls the supply of electric power from the battery 46 to a spark coil 48, the output of which is connected by leads 49 to the electrical ignition device 17c of torch igniter 17.

The collector tank 28 in addition to having a vent 29 to atmosphere is provided with means for emptying it. This comprises a suction pipe 50 leading from the bottom of the collector tank 28 to a point 51 in the air-intake 11 of the engine compressor at which, in operation of the engine, the pressure is less than atmospheric pressure.

In starting up the gas-turbine engine the switch 47 will be closed energising the electrical ignition devices 17c of the torch igniters and at the same time energising the solenoid 34c which causes the plunger 34b to move downwardly (as viewed in the drawings) so that the needle valve 40 at the lower end closes the port 43 and places the pipeline 33 in communication with the pipeline 35 so that fuel is delivered to the auxiliary jets 17b of the torch igniters 17. The fuel issuing from the auxiliary jets 17b is ignited by the electrical ignition devices 17c and a flame is projected into the associated combustion chambers 12a to ignite the fuel being delivered thereto by the injection devices 16. As stated above, the initiation of combustion in the combustion chambers 12a also initiates combustion in the remaining combustion chambers 12 through the balance pipes 18.

When combustion of the fuel delivered by the injection devices 16 has been initiated, the switch 47 is opened de-energising the electrical ignition devices 17c and also the solenoid 34c, thus allowing the plunger 34b to be moved upwardly by a spring 39 (as viewed in the drawings) to close off the pipeline 33 from the pipeline 35 and at the same time placing the pipeline 35 into communication with the drain pipe 44. When the plunger 34b is in this position any gas leaking into the manifold 36 and the pipeline 35 passes to atmosphere through the collector tank 28 and therefore does not penetrate into the main fuel system. However, the non-return valves 37 operate to prevent any substantial leakage of gas from the combustion chambers into the fuel system.

When the solenoid 34c is de-energised any fuel in the manifold 36 drains into the collector tank and fuel in the collector tank 28 is drawn off from the tank through the pipeline 50 and delivered into the engine.

After shut-down of the engine any fuel in the main injection device manifold 15 drains from the manifold 15 through the drain pipe 27 into the collector tank where it remains until the engine is next started. The provision of the collector tank has the advantage that fuel is not discharged overboard on to the aerodrome surface as is usual in the case of aircraft.

We claim:

1. In a gas turbine engine fuel system of the type having main fuel injection devices and ignition means comprising an auxiliary fuel jet and and ignition device associated therewith, a fuel supply system for the auxiliary jet comprising in combination a fuel pressure source, a two-position valve having first, second and third connections, a pressure fuel source, a supply line from said fuel pressure source to said first connection, a delivery line from said third connection to said auxiliary jet, a drain line from said second connection to a location at which in operation of the engine the pressure is less than the fuel pressure of said pressure fuel source, and means for selectively moving said valve from a position in which it places said first and third connections in communication to a position in which it places said second and third connections in communication.

2. In a gas turbine engine fuel system of the type having main fuel injection devices and ignition means therefor comprising an auxiliary fuel jet and ignition device associated therewith, a fuel supply system for the auxiliary jet comprising in combination a fuel pressure source, a valve body having first, second and third connections, a valve element movable within said valve body; means for actuating said valve element from a first position in which the first connection is in communication with the third connection and no communication exists between the second and third connections, to a second position in which communication exists between the second and third connections and no communication exists between the first and third connections, a supply line leading from the fuel pressure source to the first connection, a delivery line leading from the third connection to the auxiliary jet, and a drain line leading from the third connection to a location at which in operation of the engine the pressure is less than the fuel pressure at said pressure source.

3. In a gas turbine engine fuel system of the type having main fuel injection devices and ignition means therefor comprising an auxiliary jet and an ignition device associated therewith, a fuel supply system for the auxiliary jet comprising in combination a valve body having first, second and third connections, a valve element movable in said valve body from a first position in which communication exists between said first and third connections and no communication exists between said second and third connections, to a second position in which communication exists between said second and third connections, and no communication exists between said first and second connections; resilient means for urging said valve element to said second position; electric solenoid means for moving said valve to said first position when said solenoid means is energised, and an electrical power source for energising said solenoid means; a supply line from said fuel pressure source to said first connection; a delivery line from said third connection to said auxiliary jet; and a drain line from said second connection to a location at which in operation of the engine the pressure is less than the fuel pressure of said fuel pressure source.

4. In a gas turbine fuel system as claimed in claim 3, electrical igniter device associated with the auxiliary fuel jet, said electrical supply source being effective to energise said solenoid and at the same time to supply said electrical igniter device.

5. A gas turbine fuel system comprising in combination a main jet, an auxiliary jet located to direct its jet into that of the main jet, an ignition device for the auxiliary jet, a pressure fuel source, a location at which during operation of the engine the pressure is less than the fuel pressure at said pressure fuel source; a two-position valve, a first duct between said pressure fuel source and said valve, a second duct between said valve and said auxiliary jet and a third duct between said valve and said location, said valve being arranged so that in its one position it connects said first and second ducts and in its other position it connects said second and third ducts.

6. A gas-turbine fuel system as claimed in claim 5, wherein the location is selected so that in operation of the engine the pressure at the location is atmospheric pressure or substantially atmospheric pressure.

7. A gas-turbine fuel system as claimed in claim 5 comprising a further valve to prevent the flow of gas from the combustion space with which the torch igniter is associated, back through the auxiliary jet and second duct to said location when the two-position valve is in its second position.

8. A gas-turbine fuel system as claimed in claim 7, wherein said further valve is in the form of a non-return valve loaded to its closed position by resilient means and also arranged to be loaded to its closed position by the gas pressure adjacent the jet of the auxiliary jet.

9. A gas-turbine fuel system as claimed in claim 5, wherein the ignition device is an electrical ignition device and further comprising a solenoid or equivalent electrical device arranged to operate said two-position valve, said solenoid or equivalent electrical device being arranged in parallel with an electrical ignition device of the torch igniter so that the valve is set in its first position when the electrical ignition device is energised.

10. A gas-turbine fuel system as claimed in claim 5, wherein the two-position valve comprises a plunger working within a cylinder having a connection at one end with said first duct, a connection at its opposite end with said third duct and a third connection intermediate its ends with the second duct, and the plunger is provided at each end with a valve element so that when the plunger is moved axially in one direction within the cylinder it closes off one end connection from the second duct and opens the other end connection to the second duct and when it is moved in the opposite direction closes the second connection and opens the first.

11. A gas-turbine fuel system as claimed in claim 10, wherein the plunger is spring-loaded into the position in which the connection to the first duct is closed and the connection to the third duct is open.

12. A gas-turbine fuel system as claimed in claim 5, wherein said selected location comprises a collector tank having a vent to atmosphere, said collector tank receiving fuel draining from the fuel supply line to the auxiliary jet when the two-position valve is in its second position.

13. A gas-turbine fuel system as claimed in claim 12, wherein there is provided means to empty the collector tank when the engine is in operation comprising a suction pipe connected with a point in the engine at which a sub-atmospheric pressure exists during operation of the engine.

LIONEL HAWORTH.
PERCIE FRANCIS GREEN.

REFERENCES CITED

The following references are of record in the file of this patent:

UNITED STATES PATENTS

| Number | Name | Date |
| --- | --- | --- |
| 1,625,630 | Scott | Apr. 19, 1927 |